Jan. 28, 1969  C. THOMSON  3,424,297
ROPE-DRIVEN CONVEYORS
Filed April 13, 1967  Sheet 2 of 3
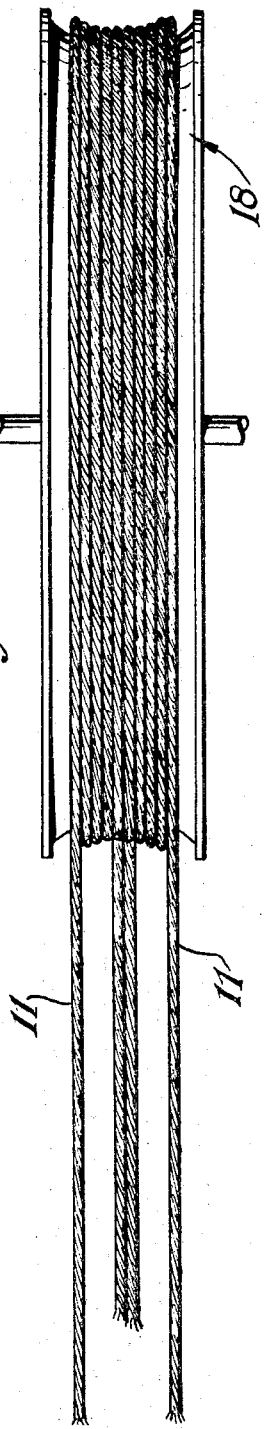
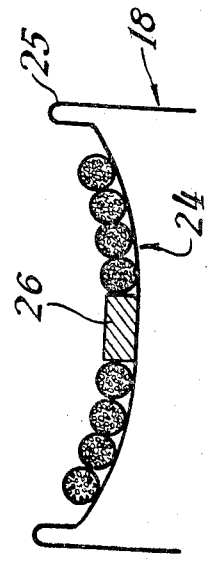
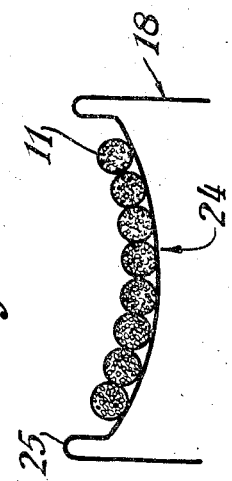
INVENTOR
CHARLES THOMSON
BY STEVENS, DAVIS, MILLER & MOSHER
ATTORNEYS

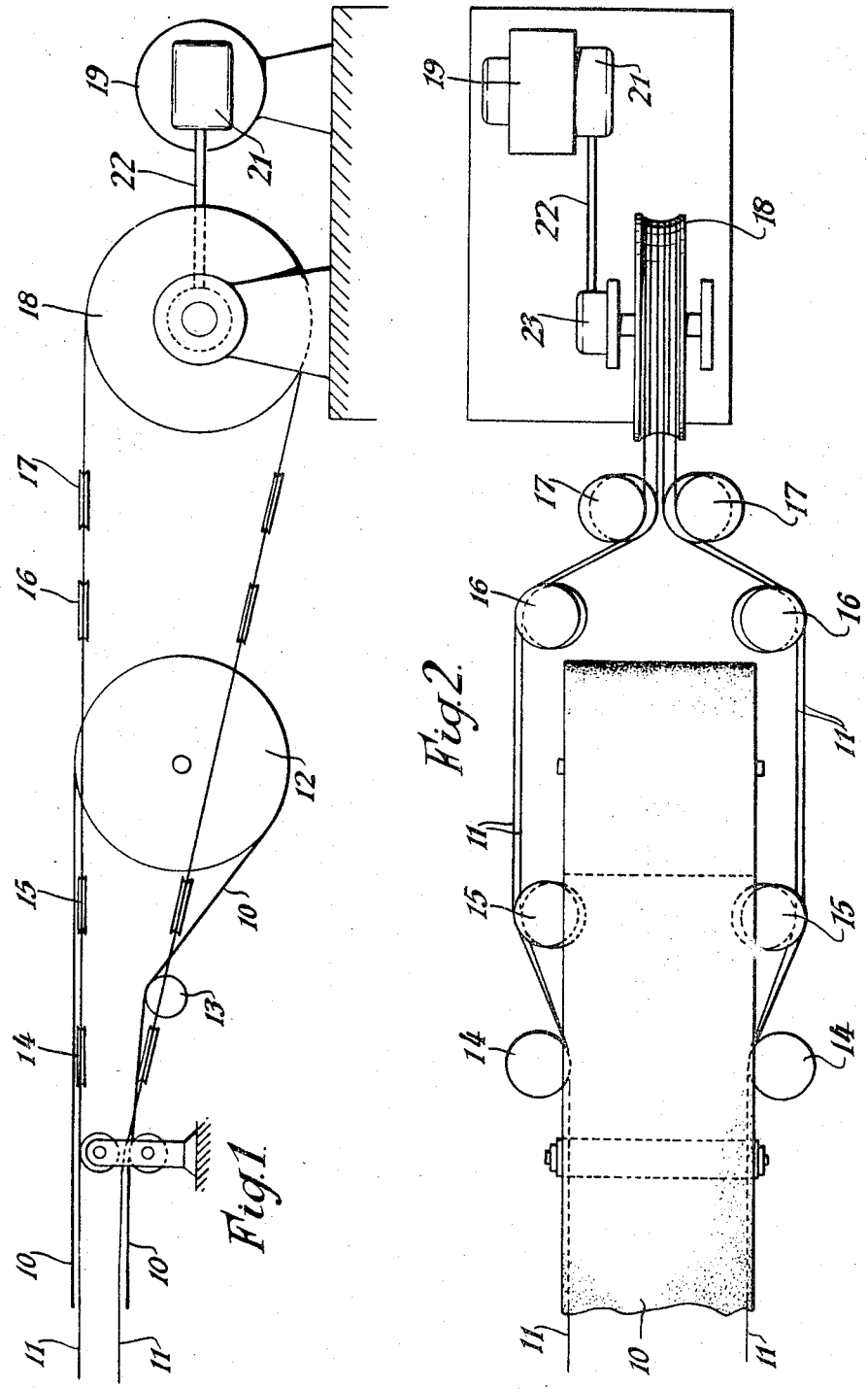

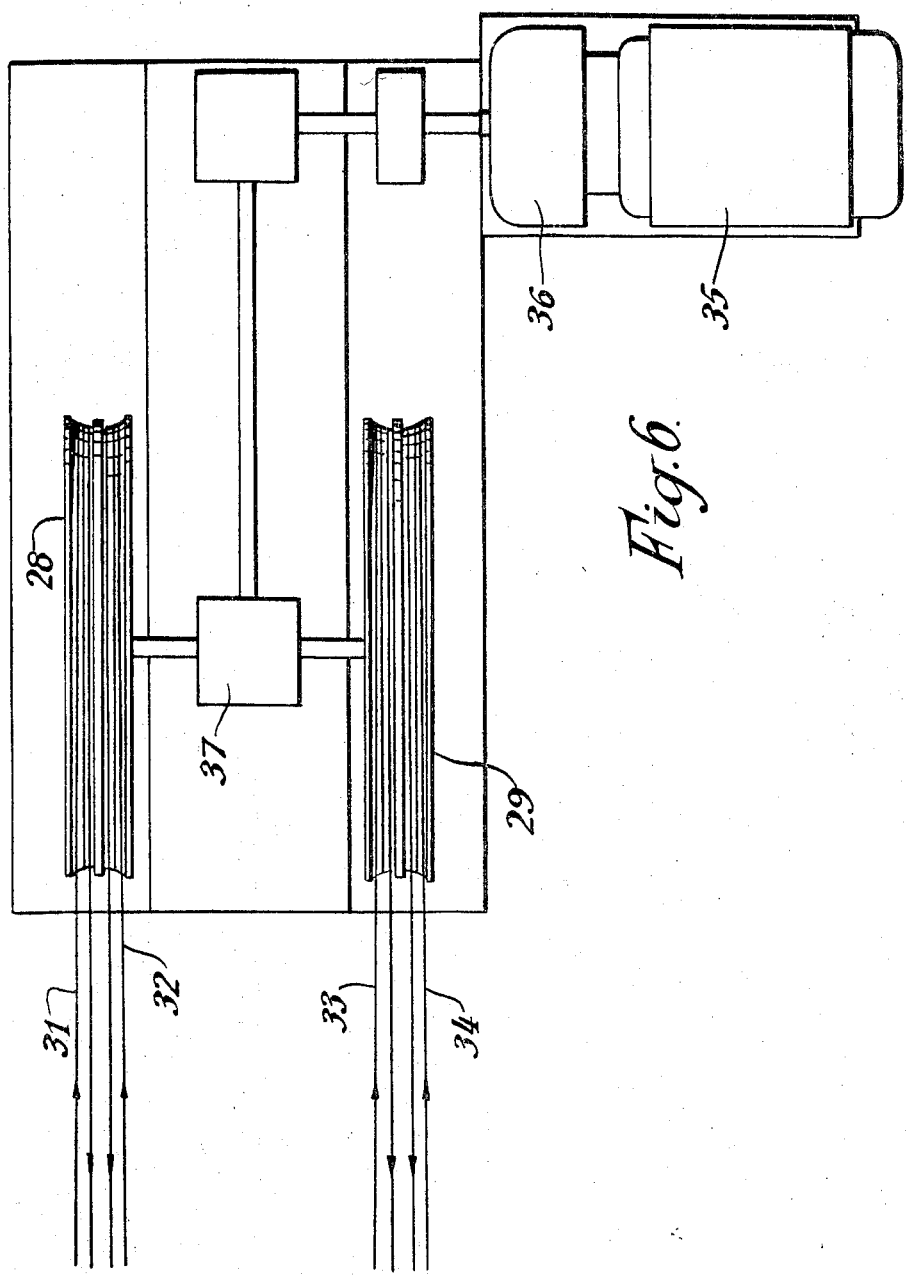

United States Patent Office 3,424,297
Patented Jan. 28, 1969

3,424,297
ROPE-DRIVEN CONVEYORS
Charles Thomson, Esher, England, assignor to Cable Belt Limited, Inverness, Scotland, a British company
Filed Apr. 13, 1967, Ser. No. 630,751
Claims priority, application Great Britain, Apr. 15, 1966, 16,651/66
U.S. Cl. 198—203    7 Claims
Int. Cl. B65g 23/28

ABSTRACT OF THE DISCLOSURE

A driving pulley for driving two ropes of a belt-driven belt conveyor and providing automatic equalisation of the tension in the said two ropes, the pulley having a tread surface which decreases in diameter from the sides towards the middle and the ropes being each led on to its adjacent one side of the tread and led off adjacent the middle, so that excess tension in one rope tends to cause it to ride towards the middle of the tread and push the other rope outwardly.

---

This invention relates to rope-driven conveyors of the kind in which an endless belt, a linked series of trough-shaped plates or other similar load-carrying means defining a conveying member is supported on a plurality of endless ropes the conveying member having rope engaging elements or configurations which engage with the ropes, and both transmit the weight of the load from the conveying member to the ropes and transmit a driving pull from the ropes to the conveying member.

The ropes are usually passed at one end of the conveyor about driving pulleys and at the other end of the conveyor about tension pulleys, and, to avoid any appreciable variation between speeds of movement of, and the tension load in, the ropes they are driven through differential gearing.

The provision of a differential gear adds to the complication and expense of the driving mechanism, and it is the object of the present invention to provide an improved driving arrangement for the ropes which enables a pair of ropes to be driven without a differential gear to distribute the drive between them.

According to the present invention, in a rope driven conveyor of the kind referred to the endless ropes comprise one or more pairs of ropes, the pair or each pair being driven by a single driving pulley having a tread surface which decreases in diameter from both sides towards the middle, each rope of the pair driven by a pulley being wrapped several times round the said pulley so that the oncoming portions of the rope are adjacent the sides of the pulley and the off-going portions of the ropes are adjacent each other at the centre of the thickness of the pulley.

By reason of their arrangement on the pulley the tension in the ropes tends to urge the portions thereof which are wrapped around the pulley towards the centre of the thickness of said pulley and any difference between the tension in the two ropes tends to be eliminated by the rope having the greater tension pushing the other rope away from the said centre of the thickness of the pulley.

An annular spacing ring, free to float transversely of the pulley tread, may be interposed between the adjacent portions of the two ropes wrapped around the said pulley to prevent them from making contact one with the other and perhaps clinging together.

The tread of the pulley, in cross section, may be of continuous concave curved shape, or may have a flat central portion and outer concave curved portions, the angle of inclination of the said surface to the axis of the pulley, in either case, increasing towards the outer sides of the tread.

The invention is hereinafter described with reference to the accompanying drawings, in which:

FIGURE 1 is a diagrammatic side view of the driving end of a rope-driven belt conveyor having two driving ropes and embodying the invention;

FIGURE 2 is a plan view corresponding to FIGURE 1;

FIGURE 3 is a plan view, on a larger scale, of the driving pulley shown in FIGURES 1 and 2;

FIGURE 4 is a partial section through one form of driving pulley according to the invention, on a larger scale than FIGURE 3;

FIGURE 5 is a partial section similiar to FIGURE 4 but showing a modified tread profile; and FIGURE 6 is a plan view of a rope driven belt conveyor having four driving ropes and including driving pulleys according to the invention.

Referring to FIGURES 1 and 2 of the drawings, the rope driven belt conveyor comprises an endless belt 10 supported and driven by two ropes 11 each forming an endless loop at one side of the conveyor belt 10, the belt having, at its edges, rope-engaging configurations such as longitudinal grooves formed in thickened portions of the belt.

At the driving end of the conveyor, the carrying run of the belt 10 is led off the ropes 11, round an end drum 12, and over a guide roller 13 back into engagement with the ropes 11 on the return run of the latter. Beyond the point where the belt 10 is lifted off them, the ropes 11 are deflected outwardly around guide pulleys 14 and are then deflected into parallelism at a wider spacing by guide pulleys 15, after which they are again deflected inwardly around guide pulleys 16 and again deflected into parallelism at a much narrower spacing by guide pulleys 17 from which they are led on to a single driving pulley 18 driven by an electric motor 19 through a reduction gear unit 21, a shaft 22, and a right-angle drive unit 23. The ropes leaving the drive pulley 18 are similarly deflected outwardly and then inwardly so as to permit the belt 10 to pass between them and to re-engage with them for the return run of conveyor.

The ropes 11, as shown in FIGURE 3, are led on to the driving pulley 18 adjacent the edges of its tread, are each wrapped several times round the said pulley, and leave the latter close together at the centre of the width of the tread.

The tread 24 of the driving pulley 18, as shown in FIGURE 4 is of a continuous concave curved shape so that its diameter is least at the centre of the thickness of the pulley and greatest at the edges of the pulley, the inclination of the said tread to the axis of the pulley increasing towards the said edges. Upstanding rims 25 are provided one at each edge of the pulley tread.

As is well known in connection with the so-called surge-wheels commonly used as driving pulleys for conveyors of this kind, the tension in the ropes tends to urge the turns of rope which lie around the pulley towards the part of the tread having the smallest diameter. If, due to irregularities in the diameter of the pulley, or for other reasons, the speed of travel of one rope tends to exceed that of the other, that rope is subjected to greater tension, and will tend to push the rope subjected to the lesser tension outwardly on the pulley, thus balancing both the tensions and the speeds of the two ropes.

Consequently, the need for a differential gear to balance the tensions of the two ropes is eliminated.

Another tread profile for the driving pulley 18 is shown in FIGURE 5, the tread 24 shown in that figure, having a cylindrical central portion so that, as viewed in cross section there is a straight central portion 26 from which concave curved portions, to which the straight portion is tangential, extend outwardly to the rims 25 at the side edges.

An annular spacing member 27, in the form of a ring, may be mounted around the tread 24 of the pulley as shown in FIGURE 5 so as to lie between the adjacent turns of the two ropes, the spacing member being free to move laterally across the pulley tread to a small extent.

Referring to FIGURE 6 of the drawings, there is shown in that figure a driving arrangement for a rope-driven belt conveyor in which two driving ropes are provided at each side edge of the conveyor belt, so that a total of four driving ropes is provided. Two driving pulleys 28 and 29, each formed as described with reference to FIGURE 3 and FIGURE 4 or 5 are provided, the pulley 28 driving the ropes 31 and 32 at one side of the conveyor and the pulley 29 driving the ropes 33 and 34 at the other side of the conveyor. The two driving pulleys 28 and 29 are driven by an electric motor 35 through a speed reduction gear unit 36 and a differential gear unit 37 only the one differential gear unit being required to provide balancing of the speeds and tensions of the four ropes.

No conveyor belt is shown in FIGURE 6, but it will be understood that the belt will pass over an end drum suitably positioned with relation to the driving pulleys 28 and 29, and the ropes will be suitably deflected to pass around the edges of the belt.

Whilst the conveying member has been referred to herein as a belt, it will be understood that it may consist of an endless flexible belt, a linked series of trough-shaped plates, or any other similar load, carrying means.

I claim:

1. A rope driven conveyor comprising a conveying member, at least one pair of endless ropes supporting said conveying member, rope engaging configurations on the conveying member to engage the ropes and transmit a driving pull from the ropes to the conveying member as well as transmitting the weight of a load on the conveying member to the ropes, and driving means in contact with the ropes to apply a driving force to the ropes, said driving means comprising a driving pulley, a smooth tread surface on said driving pulley which decreases in diameter from the sides towards the middle, each of said pair of ropes passing more than once round the driving pulley with its on-coming portion adjacent a respective one of the sides of the pulley and its off-going portion adjacent the centre of the pulley whereby tension in the ropes tends to urge them towards the said centre of the driving pulley where the diameter of said driving pulley is least and any difference in the tensions in the ropes tends to urge the rope having the lower tension outwardly towards the adjacent side of the pulley.

2. A rope driven conveyor according to claim 1, wherein an annular spacing ring, free to float transversely of the driving pulley tread, is interposed between adjacent portions of the two ropes passing around said driving pulley.

3. A rope driven conveyor according to claim 1, wherein said tread of the driving pulley, in cross section, is of the continuous concave curved shape.

4. A rope driven conveyor according to claim 1, wherein said driving means comprise two driven pulleys, and four endless ropes are provided, the four said ropes being arranged in two pairs with each pair adjacent opposite edges of the conveyor member, each pair being passed more than once round a respective one of said two driving pulleys, the driving pulleys for the two pairs of ropes being driven by a single driving motor through differential gearing.

5. A rope driven conveyor according to claim 1 wherein said conveying member is an endless member.

6. A rope driven conveyor according to claim 1, wherein said tread of the driving pulley, in cross section, has a substantially flat central portion and outer concave curved portions.

7. A rope driven conveyor according to claim 6, wherein an annular spacing ring, free to float transversely of the driving tread, is interposed between adjacent portions of the two ropes passing around said driving pulley.

References Cited

UNITED STATES PATENTS

| | | | |
|---|---|---|---|
| 870,050 | 11/1907 | Robbins | 198—184 |

FOREIGN PATENTS

| | | |
|---|---|---|
| 660,058 | 2/1929 | France. |
| 850,127 | 9/1952 | Germany. |

RICHARD E. AEGERTER, *Primary Examiner.*

U.S. Cl. X.R.

198—184